US006886116B1

(12) United States Patent
MacLellan et al.

(10) Patent No.: US 6,886,116 B1
(45) Date of Patent: Apr. 26, 2005

(54) DATA STORAGE SYSTEM ADAPTED TO VALIDATE ERROR DETECTION LOGIC USED IN SUCH SYSTEM

(75) Inventors: Christopher S. MacLellan, Walpole, MA (US); John K. Walton, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 563 days.

(21) Appl. No.: 09/915,854

(22) Filed: Jul. 26, 2001

(51) Int. Cl.[7] .............................................. G06F 11/00
(52) U.S. Cl. ........................... 714/703; 714/25; 714/48
(58) Field of Search ............................ 714/703, 25, 48

(56) References Cited

U.S. PATENT DOCUMENTS

| | | | | |
|---|---|---|---|---|
| 6,067,647 A | * | 5/2000 | Cummins | 714/703 |
| 6,539,503 B1 | * | 3/2003 | Walker | 714/703 |
| 6,590,929 B1 | * | 7/2003 | Williams | 375/224 |
| 6,604,211 B1 | * | 8/2003 | Heiman et al. | 714/41 |

OTHER PUBLICATIONS

"Error Injection Aimed at Fault Removal in Fault Tolerance Mechanisms–Criteria for Error Selection Using Field Data on Software Faults" by Christmansson et al. International Symposium on Software Reliability Engineering, Oct. 30–Nov. 2, 1996.*

"An Experimental Comparison of Fault and Error Injection" by Christmansson et al. Ninth International Symposium on Software Reliability Engineering, Nov. 4–7, 1998. pp. 369–378 Inspec Accession No.: 6097082.*

"Combining Software–Implemented and Simulation–Based Fault Injection into a Single Fault Injection Method" by Guthoff et al. Twenty–Fifth International Symposium on Fault–Tolerant Computing, Jun. 27–30, 1995. pp. 196–206 Inspec Accession No.:5028555.*

* cited by examiner

Primary Examiner—Albert Decady
Assistant Examiner—Cynthia Britt

(57) ABSTRACT

A system for validating error detection logic in a system. The system includes a plurality of information paths, each one of such paths having associated therewith an error detection logic, each one of the paths having a plurality of information bits. A test word buffer is provided for receiving a test word, such test word indicating a particular one of the plurality of information bits in a particular one of the information paths to be corrupted. The system includes a plurality of fault injectors responsive to the test word received by the buffer. Each one of the fault injectors is disposed in a corresponding one of the information paths prior to the associated the error detection logic. Each one of such fault injectors corrupts a selected one of the information bits in the corresponding one of the information paths in response to the test word received by the buffer to test whether the associated error detection logic detects such injected fault. The test word buffer stores an indication as to whether software is one of the directors is to be tested for response to a detected fault.

6 Claims, 8 Drawing Sheets

DATA STORAGE SYSTEM ADAPTED TO VALIDATE ERROR DETECTION LOGIC USED IN SUCH SYSTEM

TECHNICAL FIELD

This invention relates to data storage systems and more particularly to techniques used to test such systems. Still more particularly, the invention relates more particularly to data storage systems adapted to validate error detection logic used in such systems.

BACKGROUND

As is known in the art, test equipment has been used in a wide variety of applications. One application is to test integrated circuits. For example, in such application, test equipment is used to introduce a logic level, i.e., a relatively static input voltage into the integrated circuit to test whether the integrated circuit produces a proper output.

The need also exists to test higher level systems, such as, for example, large capacity fault tolerant data storage systems. These large capacity storage systems are used with large host (e.g., main frame or open system) computer system. The computer system generally includes data processors which perform many operations on data introduced to the computer system through peripherals included in the data storage system. The results of these operations are output to peripherals included in the storage system. It is important that the system continue to operate properly even in the effect of either a software or hardware fault. Thus, in addition to redundancy being built into such systems, the system are designed to detects faults and report such faults while the system is using a provided redundant "path" for processing the data.

More particularly, in such system a plurality of fault detection logics is provided for detecting faults in various paths during a data transfer. Each path is provided by a multi-bit bus. The fault detection logic associated with each path, or bus, may include ECC (e.g., EDAC) and parity generating/checking, for example. Any detected faults are reported back to the data transfer handling director (e.g. processor) which then reports the detected fault to the director handling the transfer or to some other designated director. Further, the program in the handling director must respond to the detected fault for exemplary by interrupting the normal process used to effect the desired data transfer. For example, in response to one detected fault, the software in the handling director may be required to deviate from its normal data transfer task and perform another task, such as, for example, collect certain data in the memory for further processing in accordance with other software instructions in the handling director.

Therefore, the need arises for a method and system for testing whether these error detection and/or correction logic are operating properly.

SUMMARY

In accordance with the invention, a system is provided for validating error detection logic. The system includes a plurality of information paths (i.e., DATA and/or CONTROL), each one of such paths having associated therewith an error detection logic, each one of the paths having a plurality of information bits. A test word buffer is provided for receiving a test word, such test word indicating a particular one of the plurality of information bits in a particular one of the information paths to be corrupted. The system includes a plurality of fault injectors responsive to the test word received by the buffer. Each one of the fault injectors is disposed in a corresponding one of the information paths prior to the associated the error detection logic. Each one of such fault injectors corrupts a selected one of the information bits in the corresponding one of the information paths in response to the test word received by the buffer to test whether the associated error detection logic detects such injected fault.

In accordance with another feature of the invention, a method is provided for testing error detection logic in a system. The system has a plurality of directors each adapted to handle a data transfer through logic in such system in accordance with software in such director, such software being adapted to deviate from a normal mode of operation in response to a report of a detected fault by such error detection logic. The method comprises: establishing in the logic a condition for injecting a fault into the logic and indicating to such logic whether the fault is anticipated by a designated the one of the directors handling the transfer or unanticipated by such designated one of the data transfer handling directors; detecting when the designated one of the directors is handling a data transfer and in response to such detection injecting a fault into the logic, such injected fault being unanticipated by the designated director; and observing whether software in the designated one of the directors responds properly to the injected fault.

In accordance with another feature of the invention, a method for validating error detection logic in a system is provided. The method includes: designating a particular one of a plurality of directors to be tested for faults in software stored in such one of the directors, each one of the directors being adapted to feed information to the logic, such software being adapted to deviate from a normal operating process in response to detection of a fault reported to such director from the logic in such logic processing information fed thereto by such directors; designating in such logic the particular one of the plurality of directors to be tested; and, detecting when the designated one of the directors is feeding data to the logic; injecting a fault into such logic upon such detection.

In accordance with still another feature of the invention, a method is provided for validating error detection logic in a system. The method comprises: testing whether hardware fault detection logics in the system are responding properly to hardware injected faults; and testing whether software in a designated one of a plurality of directors in such system responds properly to faults injected into the system with such designated director being a priori unaware of the injection of such fault.

In accordance with still another feature of the invention, a method for validating error detection logic in a system is provided. The method includes: first testing whether hardware fault detection logics in the system are responding properly to hardware injected faults; designating a particular one of a plurality of processors to be tested for faults in software stored in such processors, each one of the processors being adapted to feed information to the logic, such software being adapted to deviate from a normal operating process in response to detection of a fault reported to such director from the logic in such logic processing information fed thereto by such directors; subsequent to the first test: (a) designating in such logic the particular one of the plurality of processors to be tested; (b) detecting when the designated one of the processors is feeding data into the logic; and (c) injecting a fault into such logic upon such detection.

In accordance with yet another feature of the invention, a data storage system is provided wherein data is transferred between a host computer and a bank of disk drives through an interface. The interface includes a plurality of front end directors coupled to the host computer and a plurality of back end directors coupled to the bank of disk drives. The data passes through a cache memory as such transferred data passes between the front end directors and the back end directors. The front end and back end directors being coupled to the cache memory, such data being transferred as a series of transfers, each one of the transfers having associated therewith a diag bit and a tag. The diag bit indicates whether a hardware test is to be performed. The tag has a plurality of fields, such fields identifying: the one of the directors to effect the transfer; a processor used in such director to effect the transfer; a memory location in the cache memory to store the data being transferred as such data is transferred through the interface; and, a random number unique in time to the transfer; such memory having control logic for controlling operation of the memory, respectively. The control logic is coupled between a memory region of the memory and the directors, such system having one of the directors adapted to send test words to the control logic. The control logic includes: a plurality of information paths. Each one of the paths has associated therewith an error detection logic, each one of the paths having a plurality of information bits. The control logic includes a test word buffer for receiving the test words. The test words indicate: a particular one of the plurality of information bits in a particular one of the information paths to be corrupted; whether a hardware test is to be performed on the control logic error detection logic or whether a software test is to be performed on the software in the handling director. The test word also has: a tag data portion and a tag mask portion. The control logic also includes a plurality of fault injectors responsive to the test word received by the buffer. Each one of the fault injectors is disposed in a corresponding one of the information paths prior to the associated the error detection logic. Each one of such fault injectors is adapted to corrupt a selected one of the information bits in the corresponding one of the information paths in response to the test word received by the buffer to test whether the associated error detection logic detects such injected fault. The associated error detection logic reports detection of faults to the one of the directors sending the test words when either the hardware test is to be performed or whether the software test is to be performed on the handling director. The software test is performed by first masking the tag with the tag mask portion to provide a masked tag and then comparing the masked tag with tag data. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
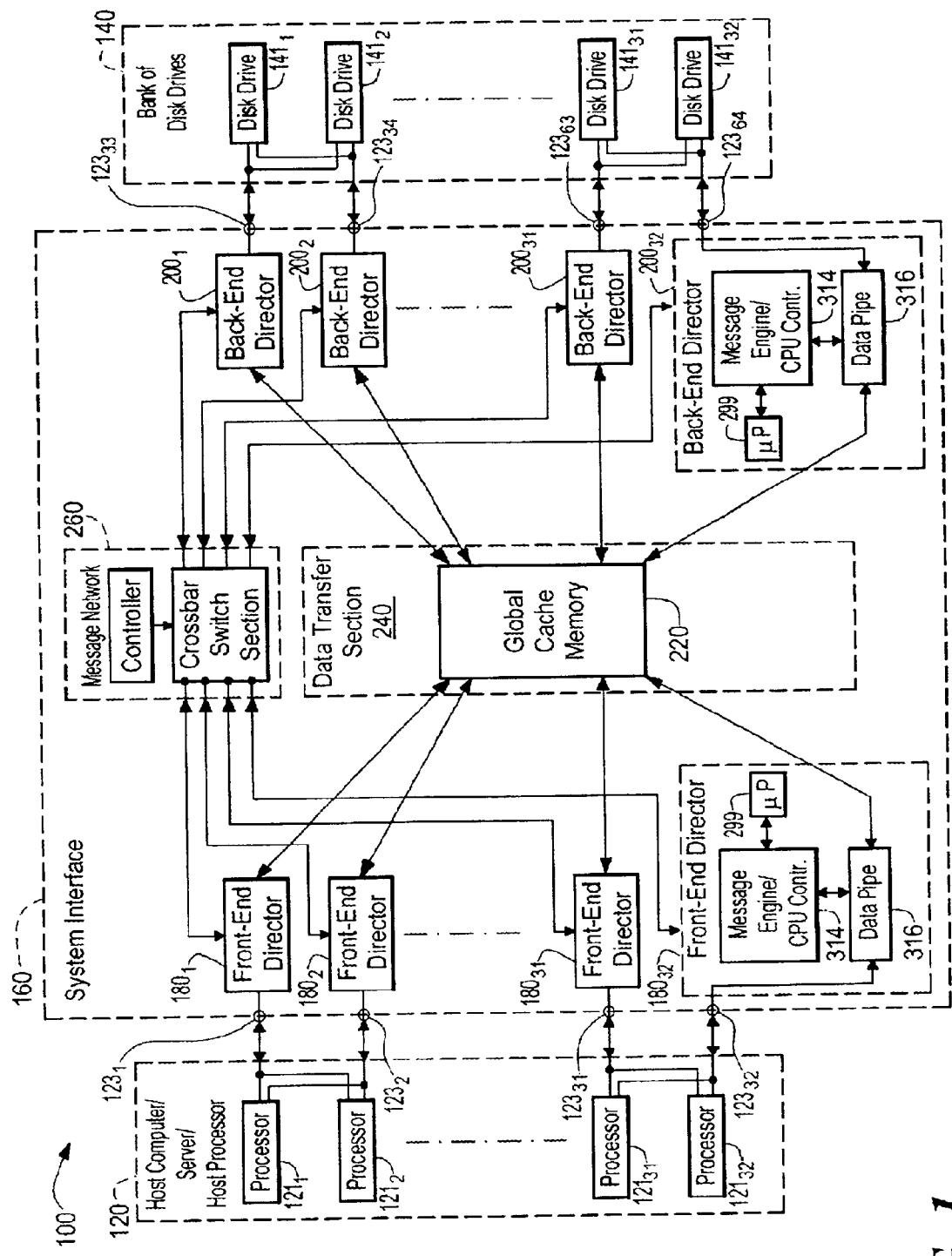
FIG. 1 is a block diagram of a data storage system having error detection logic testing according to the invention.

Referring now to FIG. 1, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{16}$ and the back-end directors $200_1$–$200_{16}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor ($\mu$P) 299 (i.e., a central processing unit (CPU) and RAM), a message/engine CPU controller 314 and a data pipe 316 described in more detail in connections with FIGS. 2, 3 and 4. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240. More particularly, in the case of the front-end directors $180_1$–$180_{32}$, the data passes between the host computer to the global cache memory 220 through the data pipe 316 in the front-end directors $180_1$–$180_{32}$ and the messages pass through the message engine/CPU controller 314 in such front-end directors $180_1$–$180_{32}$. In the case of the back-end directors $200_1$–$200_{32}$ the data passes between the back-end directors $200_1$–$200_{32}$ and the bank of disk drives 140 and the global cache memory 220 through the data pipe 316 in the back-end directors $200_1$–$200_{32}$ and again the messages pass through the message engine/CPU controller 314 in such back-end director $200_1$–$200_{32}$. With such an arrangement, the cache memory 220 in the data transfer section 240 is not burdened with the task of transferring the director messaging. Rather the messaging network 260 operates independent of the data transfer section 240 thereby increasing the operating bandwidth of the system interface 160. Further details are provided in co-pending patent application Ser. Nos.: 09/540,828 filed Mar. 3, 2000; 09/561,532 filed Apr. 28, 2000; 09/606,734 filed Jun. 29, 2000, and 09/606,730 filed Jun. 29, 2000; all assigned to the same assignee as the present invention, the entire subject matter thereof being incorporated by reference into this application.

Figure 2:
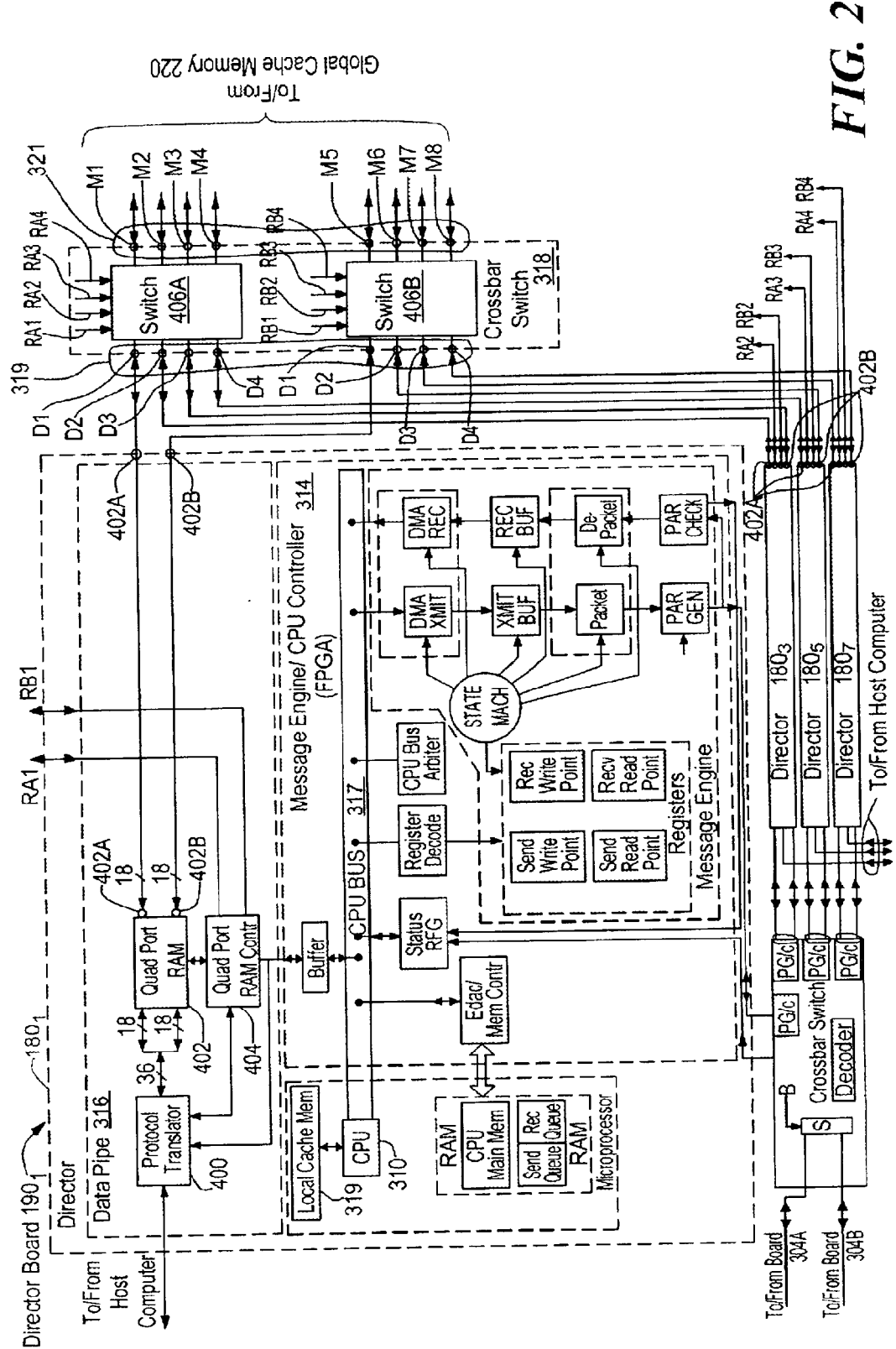
FIG. 2 is a block diagram of a director board used in the system of FIG. 1.
Figure 3:
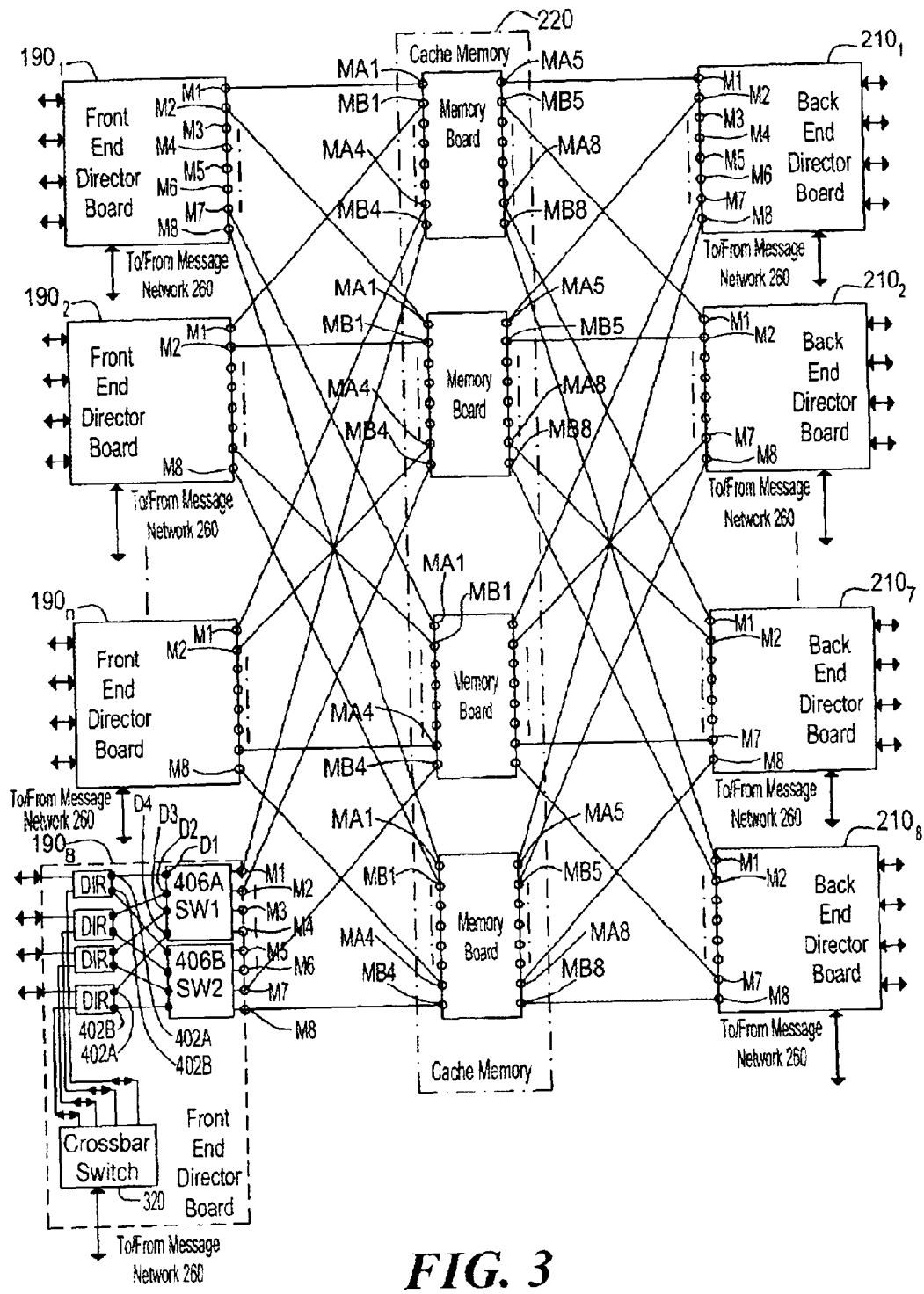
FIG. 3 is a block diagram shown connections between director boards and a cache memory used in the system of FIG. 1.

Referring now to FIGS. 2, 3, an exemplary one of the director boards $190_1$–$190_8$, $210_1$–$210_8$, here director board $190_1$ is shown to include directors $180_1$, $180_3$, $180_5$ and $180_7$. An exemplary one of the directors $180_1$–$180_4$, here director $180_1$ is shown in detail to include the data pipe 316, the message engine/CPU controller 314, the RAM 312, and the CPU 310 all coupled to the CPU interface bus 317, as shown. The exemplary director $180_1$ also includes: a local cache memory 319 (which is coupled to the CPU 310); the crossbar switch 318; and, the crossbar switch 320, described in detail in the above referenced co-pending patent applications. The data pipe 316 includes a protocol translator 400, a quad port RAM 402 and a quad port RAM controller 404 arranged as shown. Briefly, the protocol translator 400 converts between the protocol of the host compute 120, in the case of a front-end director $180_1$–$180_{32}$, (and between the protocol used by the disk drives in bank 140 in the case of a back-end director $200_1$–$200_{32}$) and the protocol between the directors $180_1$–$180_3$, $200_1$–$200_{32}$ and the global memory 220 (FIG. 1). More particularly, the protocol used the host computer 120 may, for example, be fibre channel, SCSI, ESCON or FICON, for example, as determined by the manufacture of the host computer 120 while the protocol used internal to the system interface 160 (FIG. 2) may be selected by the manufacturer of the interface 160. The quad port RAM 402 is a FIFO controlled by controller 404 because the rate data coming into the RAM 402 may be different from the rate data leaving the RAM 402. The RAM 402 has four ports, each adapted to handle an 18 bit digital word. Here, the protocol translator 400 produces 36 bit digital words for the system interface 160 (FIG. 1) protocol, one 18 bit portion of the word is coupled to one of a pair of the ports of the quad port RAM 402 and the other 18 bit portion of the word is coupled to the other one of the pair of the ports of the quad port RAM 402. The quad port RAM has a pair of ports 402A, 402B, each one of to ports 402A, 402B being adapted to handle an 18 bit digital word. Each one of the ports 402A, 402B is independently controllable and has independent, but arbitrated, access to the memory array within the RAM 402. Data is transferred between the ports 402A, 402B and the cache memory 220 (FIG. 1) through the crossbar switch 318, as shown.

A crossbar switch 318 includes a pair of switches 406A, 406B. Each one of the switches 406A, 406B includes four input/output director-side ports $D_1$–$D_4$ (collectively referred to as port 319) and four input/output memory-side ports $M_1$–$M_4$, $M_5$–$M_8$, respectively, as indicated. The input/output memory-side ports $M_1$–$M_4$, $M_5$–$M_8$ were collectively referred to as port 317). The director-side ports $D_1$–$D_4$ of switch 406A are connected to the 402A ports of the quad port RAMs 402 in each one the directors $180_1$, $180_3$, $180_5$ and $180_7$, as indicated. Likewise, director-side ports of switch 406B are connected to the 402B ports of the quad port RAMs 402 in each one the directors $180_1$, $180_3$, $180_5$, and $180_7$, as indicated. The ports $D_1$–$D_4$ are selectively coupled to the ports $M_1$–$M_4$ in accordance with control words provided to the switch 406A by the controllers in directors $180_1$, $180_3$, $180_5$, $180_7$ on busses $R_{A1}$–$R_{A4}$, respectively, and the ports $D_1$–$D_4$ are coupled to ports $M_5$–$M_8$ in accordance with the control words provided to switch 406B by the controllers in directors $180_1$, $180_3$, $180_5$, $180_7$ on busses $R_{B1}$–$R_{B4}$, as indicated. The signals on buses $R_{A1}$–$R_{A4}$ are request signals. Thus, port 402A of any one of the directors $180_1$, $180_3$, $180_5$, $180_7$ may be coupled to any one of the ports $M_1$–$M_4$ of switch 406A, selectively in accordance with the request signals on buses $R_{A1}$–$R_{A4}$. Likewise, port 402B of any one of the directors $180_1$–$180_4$ may be coupled to any one of the ports $M_5$–$M_8$ of switch 406B, selectively in accordance with the request signals on buses $R_{B1}$–$R_{B4}$. The coupling between the director boards $190_1$–$190_8$, $210_1$–$210_8$ and the global cache memory 220 is shown in FIG. 4A.

More particularly, and referring also to FIG. 1, as noted above, each one of the host computer processors $121_1$–$121_{32}$ in the host computer 120 is coupled to a pair of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to a pair of the back-end directors $200_1$–$200_{32}$, to provide redundancy in the event of a failure in one of the back-end directors $200_1$–$200_{32}$ coupled thereto). Thus, considering exemplary host computer processor $121_1$, such processor $121_1$ is coupled to a pair of front-end directors $180_1$, $180_2$. Thus, if director $180_1$ fails, the host computer processor $121_1$ can still access the system interface 160, albeit by the other front-end director $180_2$. Thus, directors $180_1$ and $180_2$ are considered redundancy pairs of directors. Likewise, other redundancy pairs of front-end directors are: front-end directors $180_3$, $180_4$; $180_5$, $180_6$; $180_7$, $180_8$; $180_9$, $180_{10}$; $180_{11}$, $180_{12}$; $180_{13}$, $180_{14}$; $180_{15}$, $180_{16}$; $180_{17}$, $180_{18}$; $180_{19}$, $180_{20}$; $180_{21}$, $180_{22}$; $180_{23}$, $180_{24}$; $180_{25}$, $180_{26}$; $180_{27}$, $180_{28}$; $180_{29}$, $180_{30}$; and $180_{31}$, $180_{32}$ (only directors $180_{31}$ and $180_{32}$ being shown in FIG. 2).

Likewise, disk drive $141_1$ is coupled to a pair of back-end directors $200_1$, $200_2$. Thus, if director $200_1$ fails, the disk drive $141_1$ can still access the system interface 160, albeit by the other bank-end director $180_2$. Thus, directors $200_1$ and $200_2$ are considered redundancy pairs of directors. Likewise, other redundancy pairs of back-end directors are: back-end directors $200_3$, $200_4$; $200_5$, $200_6$; $200_7$, $200_8$; $200_9$, $200_{10}$; $200_{11}$, $200_{12}$; $200_{13}$, $200_{14}$; $200_{15}$, $200_{16}$; $200_{17}$, $200_{18}$; $200_{19}$, $200_{20}$; $200_{21}$, $200_{22}$; $200_{23}$, $200_{24}$; $200_{25}$, $200_{26}$; $200_{27}$, $200_{28}$; $200_{29}$, $200_{30}$; and $200_{31}$, $200_{32}$ (only directors $200_{31}$ and $200_{32}$ being shown in FIG. 2). Further, referring also to FIG. 2, the global cache memory 220 includes a plurality of, here eight, cache memory boards $220_1$–$220_8$, as shown. Still further, referring to FIG. 4A, an exemplary one of the cache memory boards, here boards $220_1$ is shown. Further detail of such memory board are provided in co-pending patent application Ser. Nos. 09/746,496 filed Dec. 21, 2000, inventors John K. Walton and Christopher S. MacLellan and 09/859,547 filed May 17, 2001, inventor John K. Walton, both assigned to the same assignee as the present invention, the entire subject matter thereof being incorporated by reference into this application. Here, each cache memory board includes four memory array regions, an exemplary one thereof being shown and described in connection with FIG. 6 of U.S. Pat. No. 5,943,287 entitled "Fault Tolerant Memory System", John K. Walton, inventor, issued Aug. 24, 1999 and assigned to the same assignee as the present invention, the entire subject matter therein being incorporated herein by reference.

Figure 4A:
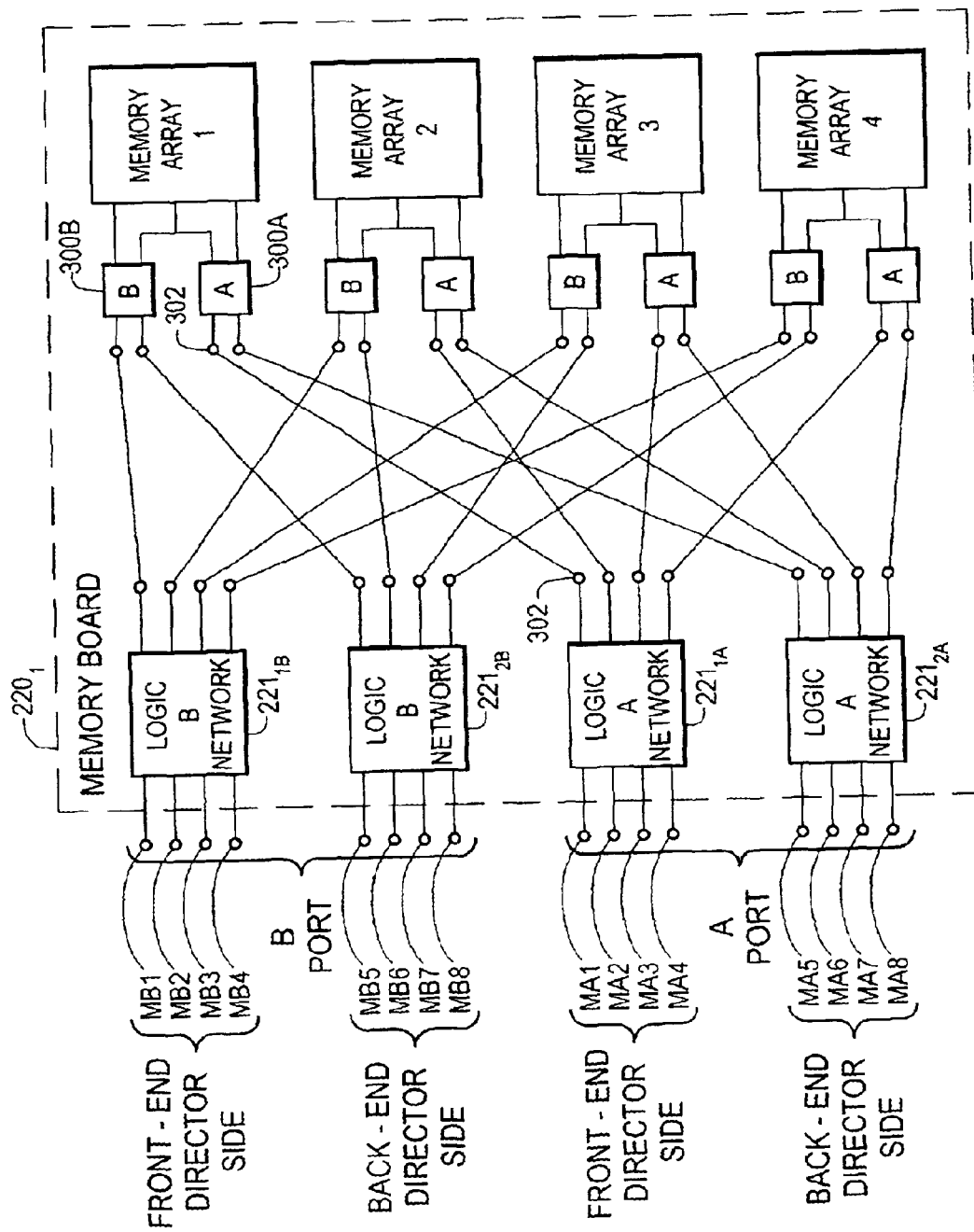
FIG. 4A is a diagram showing the connections between one of the memory boards of the cache memory of FIG. 3 and directors used in the stem of FIG. 1.
Figure 4B:
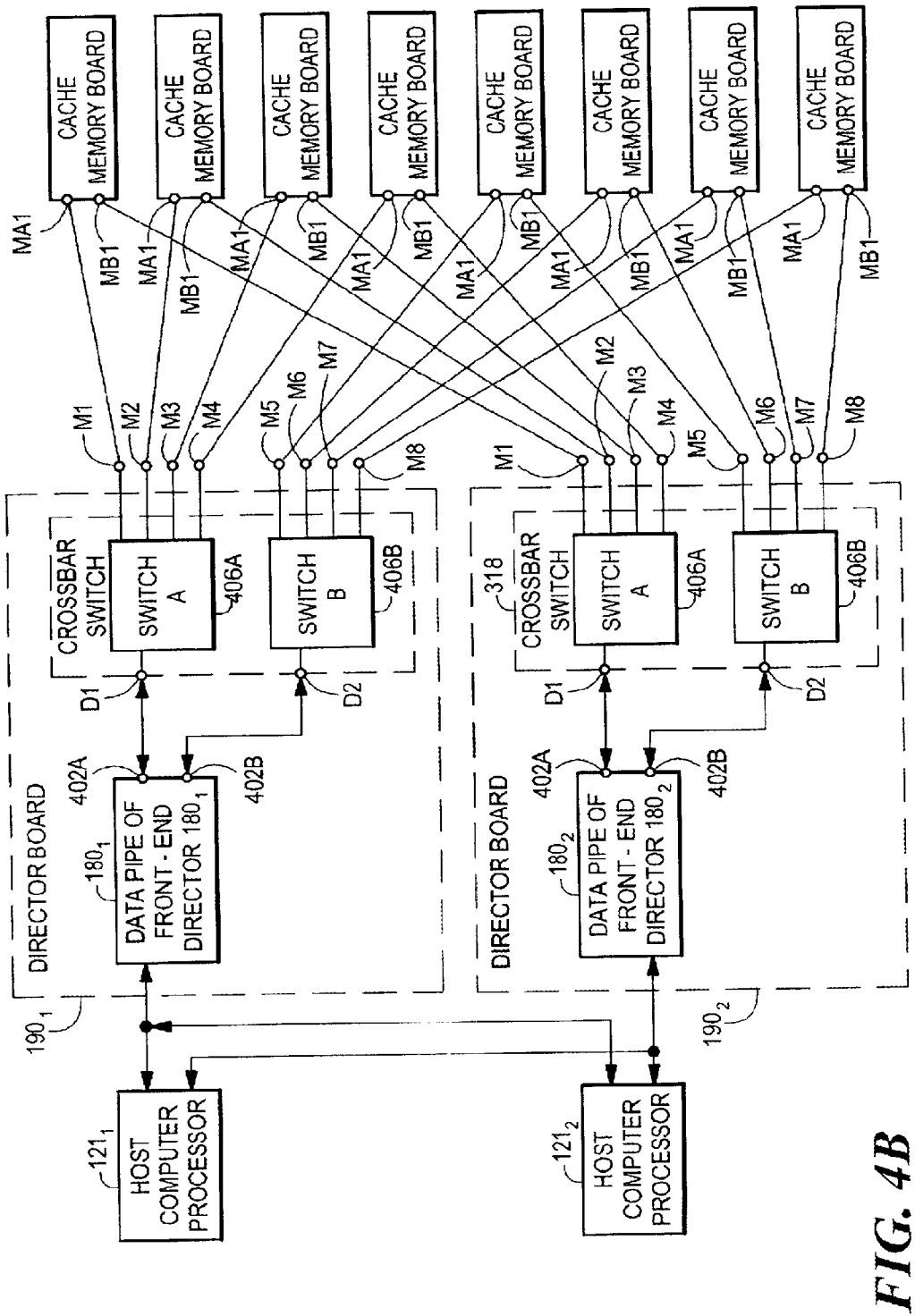
FIG. 4B is a block diagram showing connections between a pair of director board s and the cache memory of the system of FIG. 1.

As shown in FIG. 4A, the board $220_1$ includes a plurality of, here four RAM memory arrays, each one of the arrays has a pair of redundant ports, i.e., an A port logic 300A and a B port 300B. Each one of the A port and port B logics are identical in construction, an exemplary one thereof, here 300A being shown in detail in FIG. 5. The board itself has sixteen ports; a set of eight A port $M_{A1}$–$M_{A8}$ and a set of eight B ports $M_{B1}$–$M_{B8}$. Four of the eight A port, here A ports $M_{A1}$–$M_{A4}$ are coupled to the $M_1$ port of each of the front-end director boards $190_1$, $190_3$, $190_5$, and $190_7$, respectively, as indicated in FIG. 4B. Four of the eight B port, here B ports $M_{B1}$–$M_{B4}$ are coupled to the $M_1$ port of each of the front-end director boards $190_2$, $190_4$, $190_6$, and $190_8$, respectively, as indicated in FIG. 4B. The other four of the eight A port, here A ports $M_{A5}$–$M_{A8}$ are coupled to the $M_1$ port of each of the back-end director boards $210_1$, $210_3$, $210_5$, and $210_7$, respectively, as indicated in FIG. 4B. The other four of the eight B port logics 300, here B ports $M_{B5}$–$M_{A8}$ are coupled to the $M_1$ port of each of the back-end director boards $210_2$, $210_4$, $210_6$, and $210_8$, respectively, as indicated in FIG. 4B.

Considering the exemplary four A ports $M_{A1}$–$M_{A4}$, each one of the four A ports $M_{A1}$–$M_{A4}$ can be coupled to the A port of any one of the memory arrays through the logic network $221_{1A}$, (i.e., a cross-bar switch described in more detail is provided in the above-referenced co-pending patent applications). Thus, considering port $M_{A1}$, such port can be coupled to the A port logic 300A of the four memory arrays. Likewise, considering the four A ports $M_{A5}$–$M_{A8}$, each one of the four A ports $M_{A5}$–$M_{A8}$ can be coupled to the A port of any one of the memory arrays through the logic network $221_{1B}$. Likewise, considering the four B ports $M_{B1}$–$M_{B4}$, each one of the four B ports $M_{B1}$–$M_{B4}$ can be coupled to the B port logic 400B of any one of the memory arrays through logic network $221_{1B}$. Likewise, considering the four B ports $M_{B5}$–$M_{B8}$, each one of the four B ports $M_{B5}$–$M_{B8}$ can be coupled to the B port of any one of the memory arrays through the logic network $221_{2B}$. Thus, considering port $M_{B1}$, such port can be coupled to the B port of the four memory arrays. Thus, there are two paths data and control from either a front-end director $180_1$–$180_{32}$ or a back-end director $200_1$–$200_{32}$ can reach each one of the four memory arrays on the memory board. Thus, there are eight sets of redundant ports on a memory board, i.e., ports $M_{A1}$, $M_{B1}$; $M_{A2}$, $M_{B2}$; $M_{A3}$, $M_{B3}$; $M_{A4}$, $M_{B4}$; $M_{A5}$, $M_{B5}$; $M_{A6}$, $M_{B6}$; $M_{A7}$, $M_{B7}$; and $M_{A8}$, $M_{B8}$. Further, as noted above each one of the directors has a pair of redundant ports, i.e., a 402A port and a 402 B port (FIG. 3). Thus, for each pair of redundant directors the A port (i.e., port 402A) of one of the directors in the pair is connected to one of the pair of redundant memory ports and the B port (i.e., 402B) of the other one of the directors in such pair is connected to the other one of the pair of redundant memory ports. Further details may be found in the above-referenced co-pending patent applications.

Referring now to FIG. 1, the data is transferred between the host computer 120 and the bank of disk drives 140 through the global cache memory 220 as a series of data transfers at the initiation of one of the directors $180_1$–$180_{32}$, $220_1$–$220_{32}$, here sometimes referred to as the initiating or handling director. Each data transfer has a tag provided by the data transfer initiating, or handling director. The tag accompanies the data to be transferred and identifies the director handling transfer (i.e., the handling directory); the specific CPU in such handling director to handle the transfer; and a unique random number which uniquely identifies, in time, the transfer. Also sent with the tag by the data transfer handling director is a command. The command indicates whether the transfer is for the data to be written into the memory array or data to be read from the memory array; the memory location for storing or have retrieved therefrom the data; CRC and parity codes. This tag and the accompanying command are sent (via software stored in the handling director) by the handling director to the memory board. The control logic on the memory board (FIG. 4A) effects the data storage or retrieval as the case may be. Thus, the control logic controls the operation of the memory array to properly effect the desired read/write operation of the memory at the proper location thereof. Also included with the transfer is a diag bit. That is, if during a hardware test mode the handling director wishes to check whether error detection logic on the memory board responds properly to a fault the handling director will insert a logic 1 into the diag bit; otherwise, the handling director will have a logic 0 in the diag bit.

Figure 5:
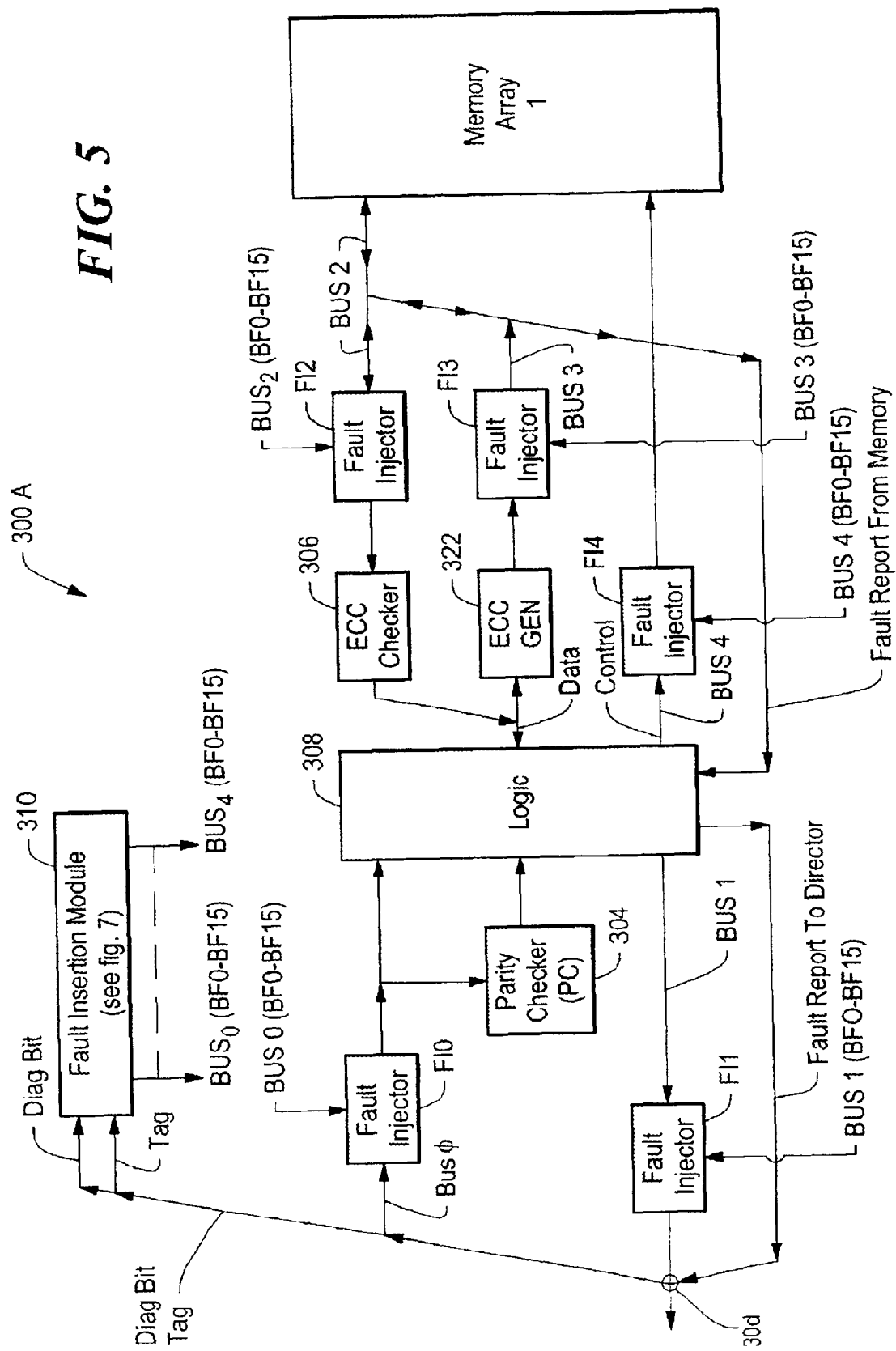
FIG. 5 is a block diagram of logic used in the memory board shown in FIG. 4A.

Prior to shipment of the system interface 160 (FIG. 1) to a customer, a first check may be made to determine whether hardware fault detection logics are operating properly (i.e., detecting and reporting anticipated faults). Next, a test may be made to determine whether the software in the handling director responds properly to faults injected into the system with such director being unaware of the injection of such fault (i.e., an unanticipated fault). More particularly, one of the directors $180_1$–$180_{32}$, $220_1$–$220_{32}$, herein sometimes referred to as the test director, stores in a memory thereof a preloaded test program. The test program operates to first perform a hardware test and then perform a software test. More particularly, the system typically first checks whether the fault detection logics (i.e., hardware) on the memory board are operating properly (i.e., whether the hardware is responding properly to the "anticipated faults" injected into the system). Next, during normal operation of the system, a test may be made to determine whether the system is responding to "unanticipated" faults (i.e., whether the software in the handling director responds properly during otherwise normal operation to the faults injected into the system without prior awareness of the handling director of such fault injection). These unanticipated faults are set up by test instructions in the test director. The test instruction is issued to the memory board and indicates, via tag data, one of the directors to be software tested. The handling director is not aware that it has become indicated by the test instruction. Thus, the handling director operates in its normal way. When it issues its tag to the memory board, the memory board, having been a priori told via the tag previously sent to by the test director that the memory board injects a fault of the type designated previously by the test director. Thus, the memory board injects a fault only when that particular a priori identified director is handling the transfer. The response of the designated handling director's software to the detected fault reported to it is observed by the testing director to determine whether this unexpecting director responds properly to the injected fault. Thus, such a fault is referred to as an unanticipated fault since it was not anticipated by the handling director. On the other hand, when a hardware fault is to be injected the handling director places a logic 1 in the diag bit accompanying the transfer. Since the handling director known a priori that a fault is being injected into the memory board, such fault is an anticipated fault (i.e., anticipated by the handling director). Referring now to FIG. 5, an exemplary one of the A port logic 300A, here an ASIC coupled between port 302 of logic network $221_{1A}$ and control path logic, not shown, in memory array 1 of the cache memory board $220_1$ (see also FIG. 4A). The A port logic 300A (FIG. 5) here, for example, has two error detectors 304, 306 (here a parity checker (PC) and an ECC checker, respectively) in this simplified example, it being understood that many more error detectors are typically included. Thus, there are error detectors, not shown, in logic 308 (described in the above-referenced patent application Ser. Nos. 09/746,496 ?? and 09/859,547) as well as in the control path logic, not shown, in memory array 1 described in the above-referenced U.S. Pat. No. 5,943,287. Errors detected in logic 308 appear on the "report errors to Director" line and errors detected in control path logic, not shown, in memory array 1 are reported to the logic 308 on the "fault report from memory" line, as indicated.

There are five fault injectors FI0–FI4 each disposed in the path of a corresponding one of five buses BUS0–BUS4, respectively. Each one of the fault injectors FI0–FI4 is identical in construction, an exemplary one thereof, here fault injector FI0, being shown in detail in FIG. 6. It is first noted that Port 302 feeds DATA/CONTROL/TAG information to the logic 300A and receives DATA from the memory array, see also FIG. 4A.

More particularly, BUS0 receives the DATA/CONTROL information and passes it to the logic 308 through fault injector FI0. BUS1 sends the DATA read from the memory array and passes it to port 302 after passing through fault injector FI1 via logic 308 as indicated. BUS 2 receives the DATA read from the memory and passes it to the logic 308 after first passing through fault injector FI2 and then through ECC checker 306, as indicated. BUS3 feeds DATA on port 302 to the memory array via logic 308 after passing through ECC generator 322 and fault injector FI3, as indicated. BUS4 couples CONTROL information at port 302 to the memory array via logic 308 after passing through fault injector FI4, as indicated. Each one of the five busses is a sixteen bit bus and is coupled to a corresponding one of the five fault injectors. The TAG and DIAG bit portions of the information at port 302 from the handling director is fed to a fault injection module 310, to be described in detail in connection with FIG. 7.

Figure 6:
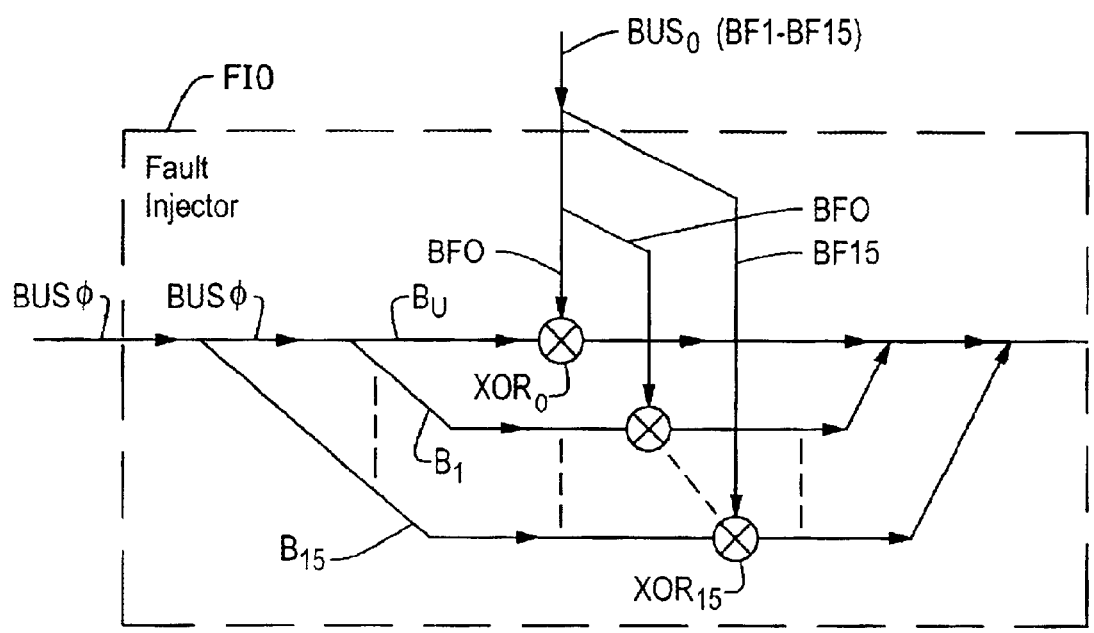
FIG. 6 is a block diagram of a fault injector used in the logic of FIG. 5.

As noted above, here each one of the five fault injectors FI0–FI4 is identical in construction, an exemplary one, here fault injector IF0 being shown in FIG. 6. The fault injectors IF0–IF4 are fed signals from a fault insertion module 310 on the ASIC (FIG. 5).

Figure 7:
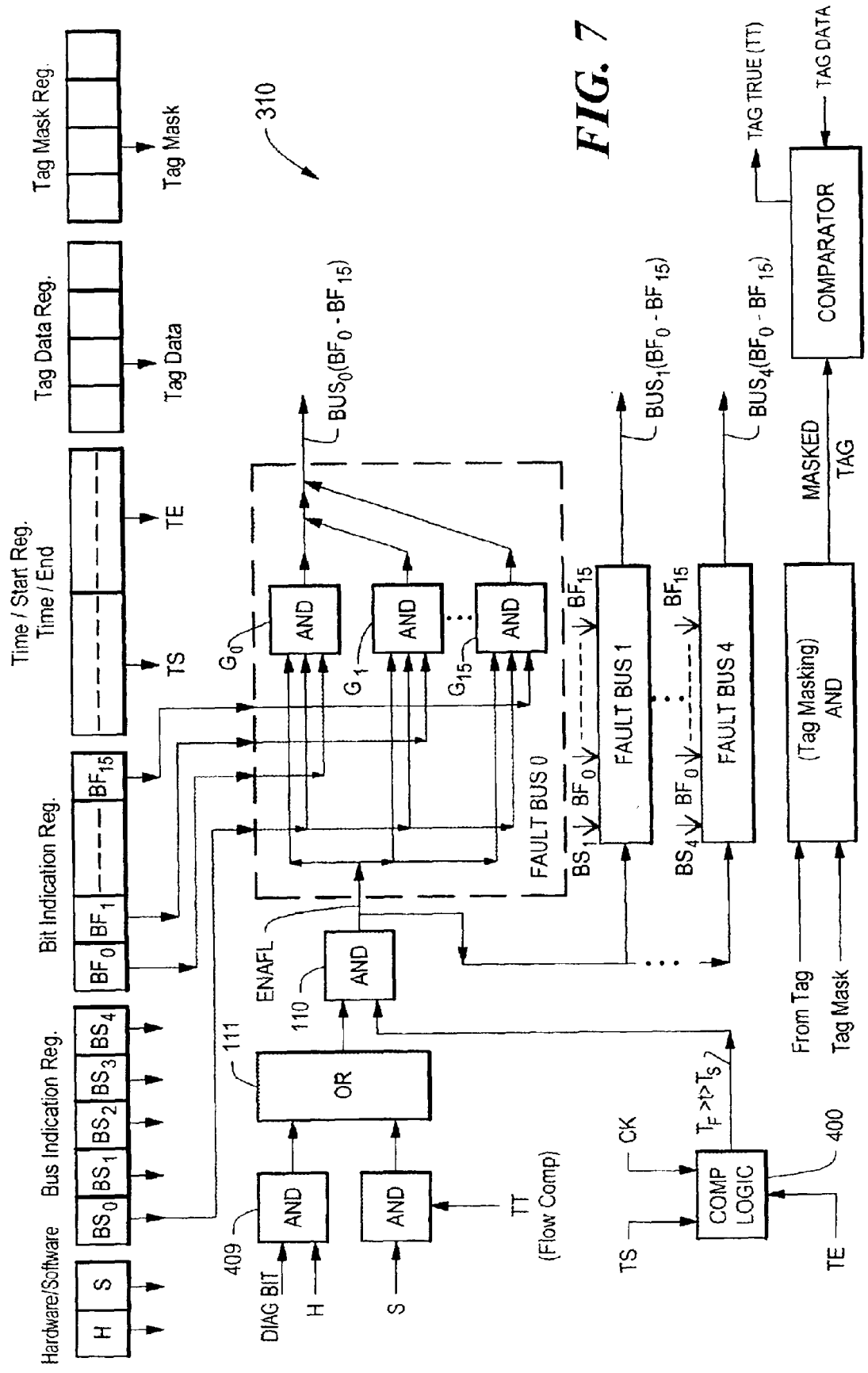
FIG. 7 is a block diagram of a fault injection module used in the logic of FIG. 6.

Referring to FIG. 7, the fault injection module 310 has here six registers for storing a test instruction sent to it by the test director. One portion of the test instruction is stored in a two bit HARDWARE/SOFTWARE register (one bit indicating whether the test is a hardware test (H is either 0 or 1) or a software test (S is either a 0 or 1). One register is a five bit BUS INDICATION register, each bit (BS0–BS4) corresponding to one of the fault injectors (FI0–FI4 in FIG. 5). Thus, if bit BS2 is a logic 1, a fault will be injected by fault injector 2 (i.e., FI2). One register is a sixteen bit BIT INDICATION register, each bit corresponding to one of sixteen conductors (i.e., bits) making up such one of the busses. Thus, the BIT INDICATION register stores bits BF0–BF15. Thus, if BS2 is a logic 1 and BF4 is a logic 1, the fault injector IF2 will inject a fault into conductor (i.e., bit 4) coupled to fault injector IF2. One register, a TIME START/TIME STOP register, stores a "time start" word (TS) indicating the time to begin a fault from the start of the data transfer and also stores a "time end" word (TE) indicating the time to end the fault from start of the data transfer. The words TS and TE are fed to a comparison logic 400 along with clock pulses CK. When the time from the start of the data transfer greater than TS and less that TE, a logic 1 is fed to AND gate 410. Thus, if either thee is a logic 1 in H or a logic 1 in S (and the handling director has been designated by the test instruction as to be software tested as indicated by a logic 1 on line TT in a manner to be described below), AND gate 410 produces a logic 1, an ENAFL signal is produced.

The process for performing a hardware and software tests is implemented by software stored in the test director. Thus, the test director first loads the five test instruction registers. More particularly, for a hardware test, a logic 1 is stored in the HARDWARE/SOFTWARE register field H and a logic 0 is stored in the S field. The particular transmission path is designated by the test register loading therein the one of the busses to be tested, i.e., a logic 1 in one of the fields BS0–BS4, corresponding to busses, BUS0–BUS4, respectively, thereby injecting a fault into a corresponding one of the fault injectors FI0–FI4, respectively. The test instruction also indicates the one of the bits in the indicated bits by placing a logic 1 in the bit to be faulted, i.e., into one of the bit fault fields $BF_0$–$BF_{15}$ corresponding to bits $B_0$–$B_{15}$, respectively of the designated bus. The test instruction also loads into the TIME START/TIME STOP register the time to start (TS) the fault and the time to end the fault (TE).

The bits BS0–BS5 in the BUS INDICATION register are fed to fault generators FAULT BUS0–FAULT BUS4, respectively, as shown. It is noted that the ENAFL signal produced by AND gate 410 is fed to all of the fault generators FAULT BUS0–FAULT BUS4. Each one of the fault generators FAULT BUS0–FAULT BUS 4 includes sixteen AND gates G0–G15, each one being fed by a corresponding one of the sixteen bits in the BIT INDICATION register. Thus sixteen outputs of the sixteen AND gates G0–G15 are sixteen bits of five busses BUS0–BUS4. Thus, considering FAULT BUS 0, the outputs of the AND gates G0–G15 therein provide the bits BF0–BF15, respectively of bus BUS0. In like manner, considering FAULT BUS 1, the outputs of the AND gates G0–G15 therein provide the bits BF0–BF15, respectively of bus BUS1. Considering FAULT BUS 2, the outputs of the AND gates G0–G15 therein provide the bits BF0–BF15, respectively of bus BUS2. In like manner, considering FAULT BUS 3, the outputs of the AND gates G0–G15 therein provide the bits BF0–BF15, respectively of bus BUS3. Finally, considering FAULT BUS 4, the outputs of the AND gates G0–G15 therein provide the bits BF0–BF15, respectively of bus BUS4.

The buses BUS0–BUS4 are fed to the fault injectors IF0–IF4, respectively. Thus, considering exemplary fault injector IF0 (FIG. 6), the BUS0 feed to such fault injector FI0 has each of the sixteen bits $B_0$–$B_{15}$ thereof fed to a corresponding one of sixteen XOR gates $XOR_0$–$XOR_{15}$, respectively. Each one of the sixteen bits $BF_0$–$BF_{15}$ on BUS0 from the fault insertion module is fed to a corresponding one of the XOR gates $XOR_0$–$XOR_{15}$, respectively. The insertion of a logic 1 into an XOR inverts (i.e., corrupts) the logic state of the bit of information fed to such XOR. Thus, for example, if the test instruction wishes to inject a fault into bit $B_2$ of BUS0, bit $BF_2$ of BUS0 is made a logic 1. More particularly, referring to FIG. 7, the test instruction places a logic 1 in the field BS0 and a logic 1 into the field BF2.

Thus, in summary, when there is to be a hardware test:
a logic 1 is loaded into the H field; a logic 1 is loaded into a particular BUS INDICATION register field;
a logic 1 is loaded into a particular BIT INDICATION field; and
TS an TE are loaded into the TIME START/TIME STOP registers.
If the transfer includes a logic 1 in the diag bit, AND gate 409 produces a logic 1 which passes aas al ogic 1 through OR gate 111 to one input of ANDgate 110. When the time afet the transfer is greaterthan TS and less than TS, a logic 1 is fed to the second input of ANGD ate 410 thus producing a logic 1 on ENAFL, Thus when ENAZFL is a logic 1, an anticipated fault is injected into a particular bit of a particular transmission path starting at a particular time after the transfer and lasting for a particular time. If the fault is detected and reported, the testing continues; on the other hand if the injected fault is not detected and reported, the hardware is failed.

After performing the hardware test, the test director performs a software test under control of softer stored therein. More particularly, the test director is also able to indicate a particular director/CPU for software testing. It does so by indicating the tag of the desired director/CPU and that tag (i.e., TAG DATA) becomes stored in the tag register in the ASIC 310 (FIG. 7). Further, such the TAG DATA has different portions, a particular portion can be selected by the test director sending tag masking (TAG MASK) information to a TAG MASK register. The tag provided with the handling director also with the information being handled by such handling director and the TAG MASK in the TAG MASK registers are AND gated to produce a MASKED TAG output. The MASKED TAG and the TAG DATA in the TAG DATA register are fed to a comparator shown in FIG. 7. The output of the comparator is a logic 1 is the two match on a bit by bit basis. This output of the comparator ("tag true", (TT)), is fed to an AND gate along with the software bit S. Thus, if the handling director has been designated as a director to be software tested, there is a logic 1 on line TT. Thus, if there is to be a software test (i.e., S=1) and the tag true, TT, is logic 1, the ENAFL is a logic 1. In such case:

a logic 1 is loaded into a particular BUS INDICATION field;

a logic 1 is loaded into a particular BIT INDICATION field; and

TS and TE are loaded into the TIME START/TIME STOP registers, to thereby produce a fault in a particular bit of a particular transmission path starting at a particular time after the transfer and lasting for a particular time.

If the fault is detected and reported to the handling director and the handling director responds properly to the fault, as monitored by the test director, the software testing continues; on the other hand if the handling director does not responds properly to the fault, a diagnosis is performed on the handling director's software.

Further, assume that the test instruction wants a fault to be injected into bit 1 of FI0, shown in detail in FIG. 6 (i.e., bit BF1 is a logic 1). a logic 1 is fed to XOR1 (FIG. 6) to invert the bit on line B1 fed to the FI0. Thus, this fault will be injected if there is to be a hardware test (H) or if there is to be a software test and the software to be tested is in the handling director producing the tag portion provided by the test director (i.e., provided by the masked tag, FIG. 7).

Thus, to put it another way, the test instruction register, or buffer in the logic stores an "event" portion of a test word sent to it by the testing director and an "action" portion of the sent test word which identifies the action requested by the test director. The event portion indicates whether the test is a hardware test or a software test. More particularly, the event portion is, in the case of a hardware test, a one bit word indicating whether the system is to check for a hardware fault, or not. In the case of a software test, the event portion indicates the tag, and hence the director/processor, the software of which is to respond to the detected hardware fault. Thus, the test instruction register also stores the event portion of the test instruction, i.e., the tag of the director/processor which is to be tested in the case of a software test, and a diagnostic bit in the case of a hardware test (i.e., a logic 1 or a logic 0 indicating that a hardware test is to be performed, or not to be performed, respectively). The action portion indicates the specific test to be performed (i.e., the fault generation test sequence to be performed by the hardware).

During a test mode, the test software first performs anticipated tests (i.e., hardware tests) on the memory boards. Thus, the test software sends a diagnostic bit to the test instruction register along with an action portion. The action portion may take any one of a number of forms, such as: raise the level of a signal on a bus assert line commencing after a delay TS for a time duration (TE-TS); or, insert a fault into a fault detection logic designated by the test instruction. There are a variety of other such actions. The memory board has a plurality of action registers, each corresponding to one of the actions. When the action is identified, the corresponding one of the action registers initiates insertion of the faults requested by the action.

After performing the hardware testing, as described above, the testing director issues a tag for a specific one of the directors/processors to be tested for software faults. In such case, the testing director sends the tag identifying the specific director/processor to the event portion of the test instruction register and an action portion for storage in such test instruction register. In carrying out the requested action, if a fault is detected the processor/director indicated by the tag designated as the one thereof which is to have its normal operating data transfer program interrupted and such designated processor has its software diverted to perform the steps initiated by the software in response to the reported fault. The action of the tagged director/processor is monitored by the testing director.

A number of embodiments of the invention have been described. Nevertheless, it will be understood that various modifications may be made without departing from the spirit and scope of the invention. Accordingly, other embodiments are within the scope of the following claims.

What is claimed is:

1. A system for validating error detection logic, the system comprising:

a plurality of information paths, each one of the paths having associated therewith an error detection logic, each one of the paths having a plurality of information bits;

a test word buffer for receiving a test word, the test word indicating a particular one of the plurality of information bits in a particular one of the information paths to be corrupted;

a plurality of fault injectors responsive to the test word received by the buffer, each one of the fault injectors being disposed in a corresponding one of the information paths prior to the associated the error detection logic, each one of the fault injectors corrupting a selected one of the information bits in the corresponding one of the information paths in response to the test word received by the buffer to test whether the associated error detection logic detects the injected fault; and wherein the test word buffer stores an indication as to whether software or a processor used to control information flow through the logic is to be tested for response to a detected fault.

2. A method for testing error detection logic in a system, the system having a plurality of directors each for handling a data transfer through logic in the system in accordance with software in the director, the software for deviating from a normal mode of operation in response to a report of a detected fault by the error detection logic, the method comprising:

establishing in the logic a condition for injecting a fault into the logic and indicating to the logic whether the fault is expected by a designated the one of the directors handling the transfer or unexpected by the designated one of the data transfer handling director;

detecting when the designated one of the directors is handling a data transfer and in response to the detection injecting a fault into the logic, the injected fault being expected by the designated director; and observing whether software in the designated one of the directors responds properly to the injected fault.

3. A data storage system wherein data is transferred between a host computer and a bank of disk drives through an interface, the interface having a plurality of front end directors coupled to the host computer and a plurality of back end directors coupled to the bank of disk drives, the data passing through a cache memory as the transferred data passes between the front end directors and the back end directors, the cache memory having control logic coupled between a memory region of the cache memory and the directors, the system having one of the directors for sending test words to the control logic; the control logic comprising:

(A) a plurality of information paths, each one of the paths having associated therewith an error detection logic, each one of the paths having a plurality of information bits;

(B) a test word buffer for receiving the test words, the test words indicating:
  (i) a particular one of the plurality of information bits in a particular one of the information paths to be corrupted; and
  (ii) whether a hardware test is to be performed on the error detection logic of the control logic or whether a software test is to be performed on the software in a designated one of the directors;

(C) a plurality of fault injectors responsive to the test word received by the buffer, each one of the fault injectors being disposed in a corresponding one of the information paths prior to the associated one of the error detection logics, each one of the fault injectors corrupting a selected one of the information bits in the corresponding one of the information paths in response to the test word received by the buffer to test whether the associated error detection logic detects the injected fault, the associated error detection logic reporting detection of faults to the one of the directors sending the test words when either the hardware test is to be performed or whether the software test on the designated one of the directors.

4. A data storage system wherein data is transferred between a host computer and a bank of disk drives through an interface, the interface having a plurality of front end directors coupled to the host computer and a plurality of back end directors coupled to the bank of disk drives, the data passing through a cache memory as the transferred data passes between the front end directors and the back end directors, the front end and back end directors being coupled to the cache memory, the data being transferred as a series of transfers, each one of the transfers having associated therewith a tag, the tag having a plurality of fields, the fields identifying: the one of the directors to effect the transfer; a memory location in the cache memory to store the data being transferred as the data is transferred through the interface; and, a random number unique in time to the transfer; the memory having control logic for controlling operation of the memory, respectively, the control logic being coupled between a memory region of the memory and the directors, the system having one of the directors for sending test words to the control logic, control logic comprising:

(A) a plurality of information paths, each one of the paths having associated therewith an error detection logic, each one of the paths having a plurality of information bits;

(B) a test word buffer for receiving the test words, the test words indicating:
  (i) a particular one of the plurality of information bits in a particular one of the information paths to be corrupted;
  (ii) whether a hardware test is to be performed on the control logic error detection logic or whether a software test is to be performed on the software in a handling one of the directors; and
  (iii) wherein the test word has: a tag data portion and a tag mask portion, the tag mask portion for masking a selected one or ones of bits in the fields in a tag of a handling one of the directors;

(C) a plurality of fault injectors responsive to the test word received by the buffer, each one of the fault injectors being disposed in a corresponding one of the information paths prior to the associated one of the error detection logic, each one of the fault injectors corrupting a selected one of the information bits in the corresponding one of the information paths in response to the test word received by the buffer to test whether the associated error detection logic detects the injected fault, the associated error detection logic reporting detection of faults to the one of the directors sending the test words when either the hardware test is to be performed or whether the software test is to be performed on the handling director when the handling director issuing a tag which when masked by the tag mask portion provides a tag masked portion indicated by the data tag received by the test buffer.

5. The system received in claim 4 wherein the test word includes an indication of when the fault is to be injected into the fault injector after the initiation of a transfer and the time duration of the injected fault.

6. The system recited in claim 3 wherein the test word includes an indication of when the fault is to be injected into the fault injector after the initiation of a transfer and the time duration of the injected fault.

* * * * *